(12) United States Patent
Gallagher et al.

(10) Patent No.: US 11,907,142 B2
(45) Date of Patent: Feb. 20, 2024

(54) CONFIGURING POLLING TIMES FOR SOFTWARE APPLICATIONS

(71) Applicant: RED HAT, INC., Raleigh, NC (US)

(72) Inventors: Brian Gallagher, Waterford (IE); Cathal O'Connor, Waterford (IE)

(73) Assignee: RED HAT, INC., Raleigh, NC (US)

( * ) Notice: Subject to any disclaimer, the term of this patent is extended or adjusted under 35 U.S.C. 154(b) by 113 days.

(21) Appl. No.: 17/592,739

(22) Filed: Feb. 4, 2022

(65) Prior Publication Data
US 2023/0251984 A1    Aug. 10, 2023

(51) Int. Cl.
G06F 13/22    (2006.01)
G06N 20/00    (2019.01)
G06F 9/54    (2006.01)
G06F 9/448    (2018.01)

(52) U.S. Cl.
CPC ............ *G06F 13/22* (2013.01); *G06F 9/4498* (2018.02); *G06F 9/541* (2013.01); *G06N 20/00* (2019.01)

(58) Field of Classification Search
CPC .................................................... G06F 16/248
See application file for complete search history.

(56) References Cited

U.S. PATENT DOCUMENTS

| 7,280,537 | B2 * | 10/2007 | Roy .................... | H04W 74/06 370/381 |
| 7,504,864 | B2 | 3/2009 | Murillo et al. | |
| 7,877,472 | B2 * | 1/2011 | Sylor .................. | H04L 43/10 709/224 |
| 2019/0370615 | A1 | 12/2019 | Murphy et al. | |

FOREIGN PATENT DOCUMENTS

JP    2019512973 A    5/2019

OTHER PUBLICATIONS

Alur, R., et al., "Minimization of Timed Transition Systems," ScienceDirect, 1997, https://www.researchgate.net/publication/2463109.
Bresolin D., et al., "Minimizing Deterministic Timed Finite State Machines," 2018, https://www.sciencedirect.com/science/article/pii/S2405896318306748.
Shirokova, E., et al., "Optimizing Components of Multi-Module Systems Based on Don't Care Input Sequences," IEEE, 2020, https://ieeexplore.ieee.org/document/9225031.

(Continued)

*Primary Examiner* — Henry Tsai
*Assistant Examiner* — Juanito C Borromeo
(74) *Attorney, Agent, or Firm* — Kilpatrick Townsend & Stockton LLP

(57) ABSTRACT

Excessive polling that may result in wasted computing resources and unnecessary network traffic can be avoided using some techniques described herein. In one example, a method can include obtaining historical data indicating execution times associated with computing operations. The method can also include determining polling times to assign to the computing operations by applying a model to the historical data. The method may also include configuring a software application to implement the polling times in relation to polling processes for transmitting requests to execute the computing operations to one or more destinations.

20 Claims, 4 Drawing Sheets

(56) References Cited

OTHER PUBLICATIONS

Tvardovskii, A.S. and Yevtushenko, N.V., "On Reduced Forms of Initialized Finite State Machines with Timeouts," Trudy ISP/RAN/Proc. ISP RAS, vol. 32, 2:125-134, 2020, http://www.mathnet.ru/php/archive.phtml?wshow=paper&jrnid=tisp&paperid=503&option_lang=eng.

Tvardovskiy, A., "On the minimization of timed Finite State Machines," Proceedings of the Institute for System Programming of the RAS, 2014, vol. 26, No. 6, https://ispranproceedings.elpub.ru/jour/article/view/864?locale=en_US.

Yevtushenko, N., et al., "Minimizing Finite State Machines with Time Guards and Timeouts," Trudy ISP/RAN/Proc. ISP RAS, vol. 29 4:139-154, 2017, https://www.researchgate.net/publication/319661629.

\* cited by examiner

CONFIGURING POLLING TIMES FOR SOFTWARE APPLICATIONS

TECHNICAL FIELD

The present disclosure relates generally to polling processes in software applications. More specifically, but not by way of limitation, this disclosure relates to configuring polling times for the software applications.

BACKGROUND

Some software applications may poll an external resource, such as another software application executing on a server, to obtain data or check for events. Polling can involve transmitting consecutive requests to the external resource, where the consecutive requests are separated by an intervening time delay.

One type of software application that uses polling is a state machine. A state machine can include logic for transitioning, through a sequence of states, from a beginning state to a desired end state. Transitions between states in the sequence, as well as computations associated with individual states in the sequence, may be triggered by asynchronous input events from a server. While in each state, the state machine may poll an external resource to obtain data (e.g., confirmation of an event) for use in performing one or more computing operations associated with that state.

DETAILED DESCRIPTION

Figure 1:
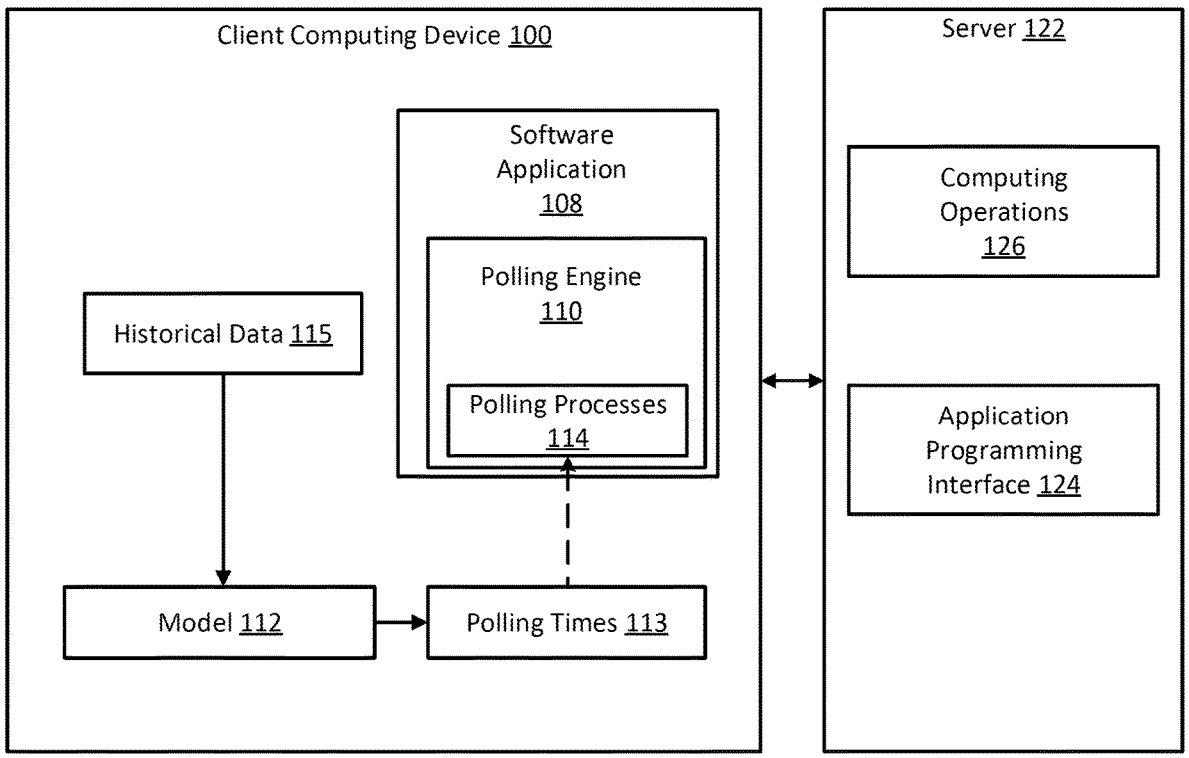
FIG. 1 is a block diagram of an example of a system for configuring polling times for use by a software application according to some aspects of the present disclosure.

A software application executing on a computing device may make use of one or more polling processes. One example of such a software application can be a finite state machine configured to transition between states in response to events. The polling processes can involve repeatedly transmitting requests (e.g., blocking asynchronous requests) to a destination for obtaining data, detecting events, or performing other computing operations. The destination is external to the software application and may be, for example, another software application on the same computing device or a remote server that can perform the computing operations. During a polling process, consecutive requests can be separated by a polling time. A polling time can be a time delay between consecutive requests in which the software application waits before transmitting the next request. Many software applications have polling times that are fixed and assigned arbitrarily, which may result in suboptimal polling. For example, a software application may repeatedly poll a destination every 0.5 seconds (s), even though the particular computing operation being called takes 5 s on average to complete. This over-polling can result in wasted computing resources, unnecessary network traffic, and decreased performance.

Some examples of the present disclosure can overcome one or more of the abovementioned problems by applying a model to historical data for determining polling times to assign to computing operations. The historical data may include a collection of recorded data associated with execution of the computing operations in the past. Each determined polling time may be specific to one of the computing operations and may be different from the other polling times. Once the polling times for each of the computing operations have been determined, a software application can be configured to implement the polling times in its respective polling processes. The polling processes can be used to transmit requests to a destination, such as a server, that can to execute the computing operations. In this way, the polling times implemented by the software application can be tailored to each individual computing operation. This can help avoid over-polling and under-polling, thereby conserving computing resources. For example, the model can use the historical data to dynamically determine polling times based on the historical performance of each individual computing operation. The software application can then be configured manually or automatically to implement the polling times determined by the model. For example, if the historical data indicates that an operation of provisioning a database takes roughly 20 minutes to complete, the software application may be configured with a polling time of 20 minutes to avoid over-polling or under-polling.

The historical data can include a collection of recorded data associated with computing operations that have been performed in the past on one or more computing devices. The historical data may include a start time indicating when a computing operation began executing, a completion time indicating when the computing operation finished executing, an execution time that may indicate a difference between the start time and the completion time for the computing operation, responses generated during the computing operation, a current state of a workflow that the computing operation may be associated with, or any combination thereof.

In some examples, the model may be a machine-learning model. The machine-learning model may be trained based on the historical data. The machine-learning model can determine a correlation between the execution times of the computing operations and parameters of the computing operations. In some examples, the model may be a clustering model that can generate clusters associated with the parameters of the computing operations. The clustering model may be, for example, a time-series clustering model. The clusters may be used to assign polling times to the computing operations assigned to each of the generated clusters.

In some examples, the model may be external to the software application. For example, the model may be stored on a remote computing device, such as a server. The remote computing device may receive historical data from a client computing device. The remote computing device may use the model and the historical data to generate polling times, which may be sent back to the client computing device. The client computing device may then configure the software application to make use of the received polling times in its polling processes.

In some examples, the polling processes executed by the software application may involve transmitting requests, such as function calls or application programming interfaces (APIs) requests, to a destination capable of performing the corresponding computing operations. The computing operations may be different types of computing operations or may be the same type of computing operation with different parameter values. Examples of the computing operations can include verifying an unprovisioned database or a provisioned database.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIG. 1 is a block diagram of an example of a system that can determine polling times for use by a software application according to some aspects of the present disclosure. The system may include a client computing device 100, such a laptop computer, desktop computer, tablet, e-reader, mobile phone, or wearable device. The client computing device 100 can include a software application 108. Examples of the software application can include a game, utility application, or service. In some examples, the software application 108 can include a state machine with state logic configured to transition from between two or more states.

The software application 108 may include a polling engine 110 for executing polling processes 114. The polling processes 114 may be executed during the runtime of the software application 108, for example to obtain data or detect events. Each of the polling processes 114 may involve transmitting consecutive requests, separated by a corresponding polling time 113, to a corresponding destination. The destinations associated with the polling processes 114 may be the same as or different from one another. For example, two of the polling processes 114 may transmit their requests to different destinations, such as different servers. Each of the polling processes 114 may be assigned its own polling time, which may be the same as or different from the other polling times 113 assigned to the other polling processes 114.

In the example shown in FIG. 1, the computing device 100 is communicatively coupled to a server 122, which may serve as one of the destinations for the polling requests. The client computing device 100 can be communicatively coupled to the server 122 via one or more networks, such as the Internet. The client computing device 100 may interface with the server 122 via an application programming interface 124. For example, the client computing device 100 can transmit requests, as part of the polling processes 114, to the API 124 of the server 122 for causing the server 122 to implement corresponding computing operations and return corresponding results to the software application 108.

The polling times 113 assigned to the polling processes 114 may be determined by a model 112. The model 112 may use historical data 115 to determine the polling times 113 to assign to the computing operations 126. The historical data 115 may be collected by one or more computing devices, such as the server 122, as the computing operations 126 are performed by the computing devices. The historical data may include a collection of records related to computing operations 126 that have been performed by said computing devices. In some examples, the historical data may specify the computing operations 126, execution times associated with the computing operations 126, start times associated with the computing operations 126, completion times associated with the computing operations 126, parameters passed to the computing operations 126, and outputs from the computing operations 126. In some examples where the software application 108 includes a state machine, the historical data 115 may indicate a state of the state machine during an execution time associated with the computing operation 126 being performed.

Although FIG. 1 shows the model 112 as being located on the client computing device 100, in other examples the model 112 may be located elsewhere, such as in another location that is external to the client computing device 100 and accessible to the client device 100. For example, the model 112 may be stored on a remote computing device (e.g., a cloud server). The remote computing device may be configured to receive the historical data 115 and apply the model 112 thereto to determine the polling times 113. The remote computing device may then transmit the polling times 113 back to the client computing device 100 for use in configuring the software application 108. In some examples, the client computing device 100 may then configure (e.g., automatically) the polling processes 114 of the software application 108 to implement the received polling times.

In some examples, the model 112 may be a time-series clustering model that may use a clustering method, such as k-means clustering, to generate one or more clusters. Each cluster in the one or more clusters can correspond to one of the computing operations 126. The processor can assign a respective polling time 113 to each cluster of computing operations 126. In some examples, the model 112 may be a machine-learning model, such as a neural network, that can be trained or configured using the historical data. The machine learning model can assign polling times 113 to the computing operations 126 based on its training.

The polling times 113 may be unique to each computing operation 126. For example, the processor may use the model 112 to determine a first polling time for a first computing operation and a second polling time for a second computing operation. The first polling time 113 may be the same as or different from the second polling time 113, and the first computing operation 126 may be the same as or different from the second computing operation 126. As one specific example, the polling engine 110 can determine the first polling time 113 to be 0.01 s for a request to access contents of a first type of database. The processor can also determine the second polling time 113 to be 0.05 s, where the second computing operation includes requesting to access contents of a second type of database.

In some examples, the processor 102 can configure the software application 108 by editing a configuration file of the software application 108 to include the polling times 113. The software application 108 may be able to read the configuration file and implement the polling times 113. In another example, the processor 102 can configure the software application 108 by modifying an environment variable or parameter of the software application 108 while the software application 108 is executing, for example, during a runtime of the software application 108. In still another example, the processor 102 can configure the software application 108 by modifying the contents of a memory location that is accessible to the software application to include the polling times 113.

Figure 2:
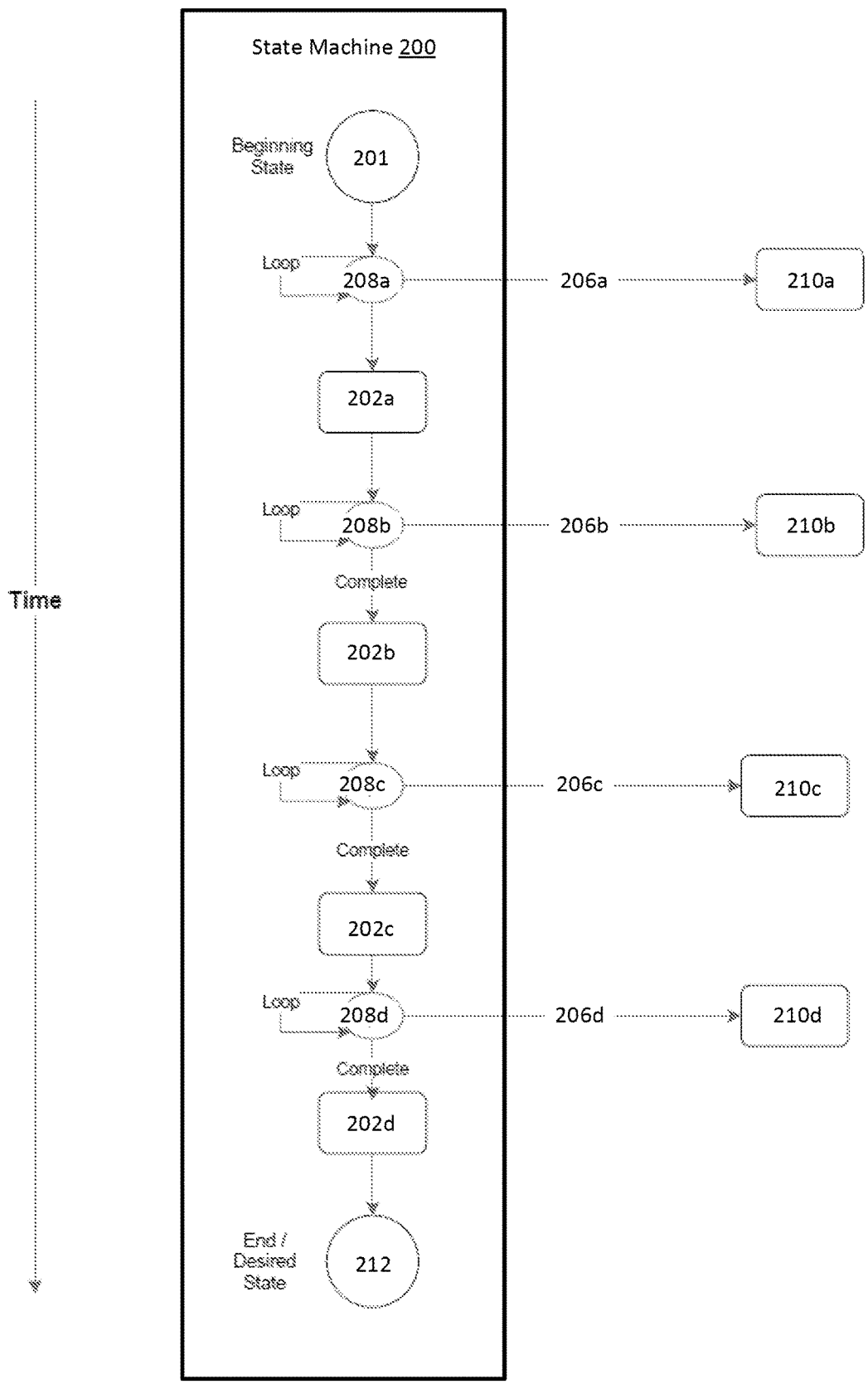
FIG. 2 is a block diagram of a state machine with polling processes that may be configured according to some aspects of the present disclosure.

As described above, in some examples the software application 108 can include a state machine. One example of such as state machine 200 is shown in FIG. 2. The state machine 200 can implement polling processes 208a-d, which may be similar to those described above. In this example, the state machine 200 can begin in an initial state 201. The state machine 200 may then transition between a sequence of states 202a-d, before arriving at an end state 212, where execution of the state machine may halt.

While in each state, the state machine 202 can execute corresponding state logic. The state logic can implement various functionality along with a corresponding one of the polling processes 208a-d. Each of the polling processes 208a-d can involve transmitting one or more requests 206a-d to a corresponding one of the destinations 210a-d for performing one or more corresponding computing operations. For example, the polling process 208a may execute a polling loop to transmit consecutive requests 206a (e.g., calls or API requests) to destination 210a, where a first polling time that separates the consecutive requests 206a is specifically selected and tailored to the computing operation that is to be performed by destination 210a. Similarly, the polling process 208b may execute a polling loop to transmit consecutive requests 206b to destination 210b, where a second polling time that separates the consecutive requests 206b is specifically selected and tailored to the computing operation that is to be performed by destination 210b. The second polling time may be the same as or different from the first polling time.

The polling processes 208a-d may be configured with the polling times prior to or during execution of the state machine 202. In some examples, the polling times may be dynamically updated (e.g., adjusted) after execution of the state machine 202 has begun. This may allow the polling times to be continually adjusted over time, for example as additional historical data 115 is gathered and the outputs from the model 112 are further refined.

In some examples, the state machine 200 can be part of a Kubernetes operator. Kubernetes is a container orchestration platform configured to help manage containers (e.g., relatively isolated virtual environments) in distributed computing environments, such as cloud computing environments. An operator, in the Kubernetes context, is software for automating various repeatable tasks, such as deployment, scaling, and backup of software resources. Each operator can be assigned to manage a software resource, such as a stateful application. Once deployed, operators can create, configure, and manage instances of their assigned software resources on behalf of a user in a declarative way. Part of the functionality of an operator can involve transitioning between a series of states. While in some or all of the states, the operator may poll external destinations by transmitting requests to the destinations. Examples of the destinations may include a server or database. The requests may be for data or for triggering certain computing operations to be performed at the destinations.

It will be appreciated that the state machine 200 shown in FIG. 2 is intended to be illustrative and non-limiting. Other examples may involve other types of state machines that have more states, fewer states, different states, or a different order of the states than is shown in FIG. 2. And although FIG. 2 depicts one polling process-per-state, other examples may involve multiple polling processes being implemented in a single state.

Figure 3:
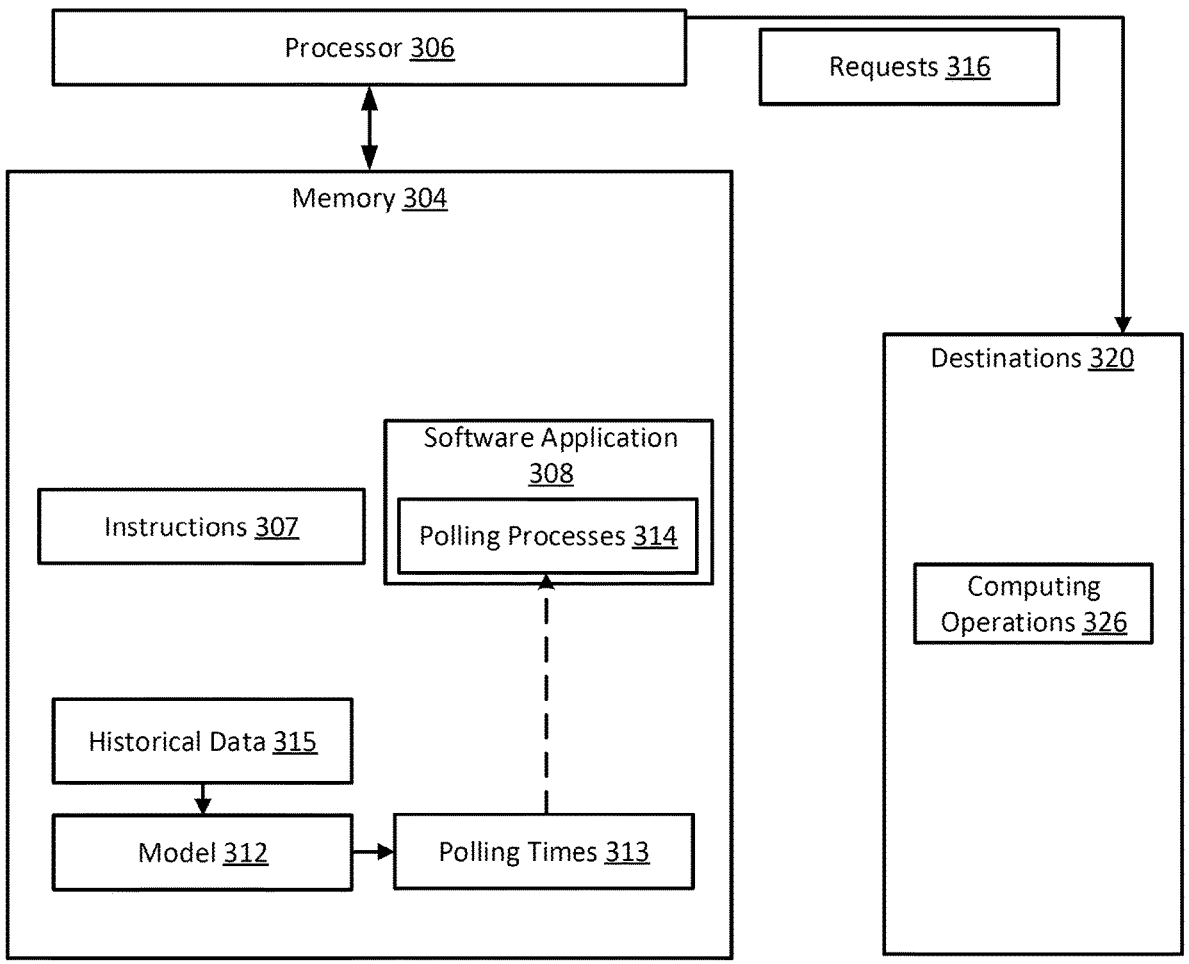
FIG. 3 is a block diagram of another example of a system for configuring polling times for use by a software application according to some aspects of the present disclosure.

FIG. 3 is a block diagram of another example of a system that can be used for determining polling times 313 usable by a software application 308 according to some aspects of the present disclosure. The system can include a processor 306 and a memory 304. The processor 306 can include one processor or multiple processors. Non-limiting examples of the processor include a Field-Programmable Gate Array (FPGA), an application-specific integrated circuit (ASIC), a microprocessor, etc. The memory 304 may include instructions 307 that may be executable by the processor 306. The instructions can include processor-specific instructions generated by a compiler or an interpreter from code written in any suitable computer-programming language, such as C, C++, C #, etc.

The memory 304 can include a software application 308. The software application 308 can execute polling processes 314. The polling processes 314 may implement polling times 313 (e.g., delays) between transmitting consecutive requests 316 for performing computing operations 326 to one or more destinations 320 that are external to the software application 308.

In some examples, the processor 306 determines the polling times 313 using a model 312. The model 312 may use historical data 315 to determine the polling times 313 to assign to the computing operations 326. In some examples, the model 312 may be a machine-learning model. In some examples where the model 312 is a machine-learning model, the model 312 may be trained using the historical data 315. The model 312 can determine a correlation between execution times of the computing operations 326 and parameters of the computing operations 326. The execution times can be differences between start times and completion times of the computing operations 326. The model may use clustering methods, such as a k-means clustering, to generate clusters associated with the parameters of the computing operations 326. The clustering model may be a time-series clustering model that may generate the clusters based on flattened time-series data associated with the computing operations 326. The clusters may be used to assign polling times 313 to the computing operations 326 in each cluster of the generated clusters. The polling times 313 associated with the computing operations 326 may be implemented using any suitable technique, such as by updating a configuration file for the software application 308 with the polling times.

Figure 4:
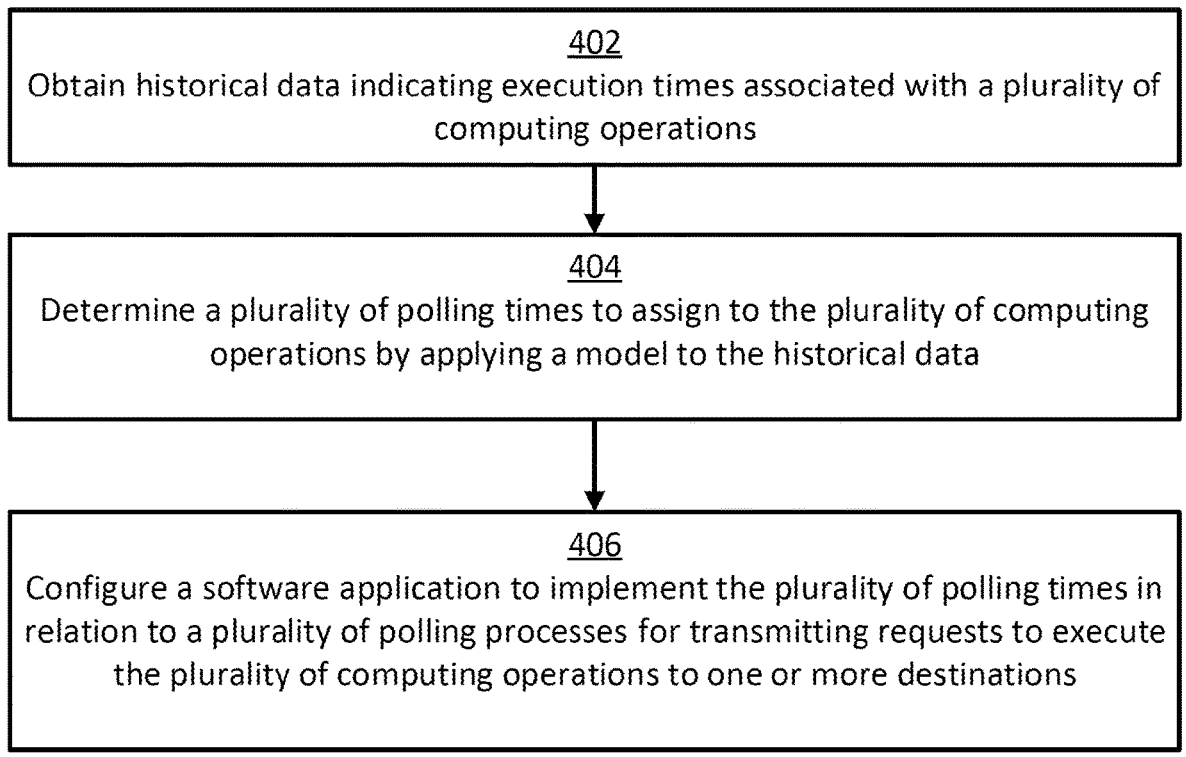
FIG. 4 is a flow chart of an example of a process for configuring polling times for use by a software application according to some aspects of the present disclosure.

FIG. 4 is a flow chart of an example of a process for determining polling times usable by a software application according to some aspects of the present disclosure. Other examples may include more operations, fewer operations, different operations, or a different order of the operations than is shown in FIG. 4. The process is described below with reference to the components of FIG. 3 above. In some examples, the process may prevent excessive polling, thereby preventing computing resources (e.g., processing power, memory, storage space, network bandwidth, etc.) from being wasted.

In block 402, the processor 306 obtains historical data 315 indicating execution times associated with a plurality of computing operations 326. Each execution time may represent a difference between a start time and a completion time associated with a computing operation 326. The historical data 315 may also include start times that may indicate when the computing operations 326 began executing, completion times that may indicate when the computing operations 326 finished executing, responses generated from the execution of the computing operations 326, states of a workflow that the computing operations 326 may be associated with, or any combination thereof. In some examples where the software application 308 includes a state machine, the historical data 315 may include a state of the state machine that can correspond to the computing operation 326 executing during the state or during transitions between multiple states of the state machine.

In block 404, the processor 306 determines a plurality of polling times 313 to assign to the plurality of computing operations 326 by applying a model 312 to the historical data 315. In one example, the processor 306 can determine, using the model 312, a first polling time for a first computing operation and a second polling time for a second computing operation. The first polling time may be the same as or different from the second polling time, and the first computing operation may be the same as or different from the second computing operation. As one specific example, the processor 306 can determine the first polling time to be 10 seconds for a first request to access a resource on a web server, such as an HTTP server. The processor 306 can determine the second polling time to be 20 seconds for a second request to create or update a resource on the web server.

In block 406, the processor 306 configures a software application 308 to implement the plurality of polling times 313 in relation to a plurality of polling processes 314 for transmitting requests 316 to execute the plurality of computing operations to one or more destinations 320. The processor 306 can configure the software application 308 by editing a configuration file for the software application 308 to include the plurality of polling times 313. In another example, the processor 306 can configure the software application 308 by modifying a runtime variable of the software application 308. The one or more destinations 320 can be external to the software application 308. In one example, the processor 308 may assign a first polling time to a first request corresponding to the first computing operation, the first request being transmitted to a first destination. The processor 308 may assign a second polling time to a second request corresponding to a second computing operation, the second request being transmitted to a second destination. The second destination may be the same or different from the first destination.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. For instance, any example described herein can be combined with any other example to yield further examples.

The invention claimed is:

1. A non-transitory computer-readable medium comprising program code that is executable by a processor for causing the processor to:
obtain historical data indicating execution times associated with a plurality of computing operations;
determine a plurality of polling times to assign to the plurality of computing operations based on the historical data, wherein each polling time of the plurality of polling times is a respective delay period in which to wait between transmitting consecutive requests to execute a respective computing operation among the plurality of computing operations; and
configure a software application to implement the plurality of polling times in relation to a plurality of polling processes for transmitting requests to execute the plurality of computing operations to one or more destinations.

2. The non-transitory computer-readable medium of claim 1, wherein the execution times each indicate a respective difference between a start time and a completion time for executing a respective computing operation of the plurality of computing operations during a prior time period.

3. The non-transitory computer-readable medium of claim 1, the one or more destinations being external to the software application.

4. The non-transitory computer-readable medium of claim 1, wherein the software application includes a state machine configured to execute first state logic in a first state and second state logic in a second state, the first state logic being configured to execute a first polling process involving transmitting a first set of consecutive requests to one or more application programming interfaces (APIs) for implementing a first computing operation of the plurality of computing operations, the second state logic being configured to execute a second polling process involving transmitting a second set of consecutive requests to the one or more APIs for implementing a second computing operation of the plurality of computing operations, and further comprising program code that is executable by the processor for causing the processor to configure the software application to implement the plurality of polling times by:
configuring the first polling process to pause for a first polling time of the plurality of polling times between the first set of consecutive requests; and
configuring the second polling process to pause for a second polling time of the plurality of polling times between the second set of consecutive requests, the second polling time being different from the first polling time.

5. The non-transitory computer-readable medium of claim 4, wherein the first computing operation is a first type of computing operation, and the second computing operation is a second type of computing operation that is different from the first type of computing operation.

6. The non-transitory computer-readable medium of claim 4, wherein the first computing operation is a particular computing operation configured with a first parameter value, and the second computing operation is the particular computing operation configured with a second parameter value.

7. The non-transitory computer-readable medium of claim 6, wherein the first parameter value is a first value of a parameter and the second parameter value is a second value of the parameter, the second value being different than the first value.

8. The non-transitory computer-readable medium of claim 1, further comprising program code that is executable by the processor for causing the processor to:
determine the plurality of polling times using a model, wherein the model is a machine-learning model configured using the historical data.

9. The non-transitory computer-readable medium of claim 8, further comprising program code that is executable by the processor for causing the processor to train the machine-learning model using the historical data.

10. The non-transitory computer-readable medium of claim 1, further comprising program code that is executable by the processor for causing the processor to:
determine the plurality of polling times using a model, wherein the model is a time-series clustering model configured to:
generate a plurality of clusters corresponding to the plurality of computing operations; and
assign a respective polling value to each cluster of the plurality of clusters.

11. The non-transitory computer-readable medium of claim 1, further comprising program code that is executable by the processor for causing the processor to configure the software application to implement the plurality of polling times by updating a configuration file for the software application based on the plurality of polling times.

12. A method comprising:
obtaining, by one or more processors, historical data indicating execution times associated with a plurality of computing operations;

determining, by the one or more processors, a plurality of polling times to assign to the plurality of computing operations based on the historical data, wherein each polling time of the plurality of polling times is a respective delay period in which to wait between transmitting consecutive requests to execute a respective computing operation among the plurality of computing operations; and configuring, by the one or more processors, a software application to implement the plurality of polling times in relation to a plurality of polling processes for transmitting requests to execute the plurality of computing operations to one or more destinations.

13. The method of claim 12, wherein the execution times each indicate a respective difference between a start time and a completion time for executing a respective computing operation of the plurality of computing operations during a prior time period.

14. The method of claim 12, the one or more destinations being external to the software application.

15. The method of claim 12, wherein the software application includes a state machine configured to execute first state logic in a first state and second state logic in a second state, the first state logic being configured to execute a first polling process involving transmitting a first set of consecutive requests to one or more application programming interfaces (APIs) for implementing a first computing operation of the plurality of computing operations, the second state logic being configured to execute a second polling process involving transmitting a second set of consecutive requests to the one or more APIs for implementing a second computing operation of the plurality of computing operations, and further comprising implementing the plurality of polling times by:

configuring the first polling process to pause for a first polling time of the plurality of polling times between the first set of consecutive requests; and configuring the second polling process to pause for a second polling time of the plurality of polling times between the second set of consecutive requests, the second polling time being different from the first polling time.

16. The method of claim 15, wherein the first computing operation is a particular computing operation configured with a first parameter value, and the second computing operation is the particular computing operation configured with a second parameter value.

17. The method of claim 16, wherein the first parameter value is a first value of a parameter and the second parameter value is a second value of the parameter, the second value being different than the first value.

18. The method of claim 12, further comprising determining the plurality of polling times using a model, wherein the model is a machine-learning model configured using the historical data.

19. The method of claim 12, further comprising determining the plurality of polling times using a model, wherein the model is a time-series clustering model configured to:

generate a plurality of clusters corresponding to the plurality of computing operations; and assign a respective polling value to each cluster of the plurality of clusters.

20. A system comprising:

a processor; and a memory including instructions executable by the processor for causing the processor to:

obtain historical data indicating execution times associated with a plurality of computing operations, wherein the execution times each indicate a respective amount of time associated with executing a respective computing operation of the plurality of computing operations during a prior time period;

determine a plurality of polling times to assign to the plurality of computing operations by applying a model to the historical data; and configure a software application to implement the plurality of polling times in relation to a plurality of polling processes for transmitting requests to execute the plurality of computing operations to one or more destinations.

* * * * *